April 7, 1936.  W. C. KRUEGER  2,036,416
APPARATUS AND PROCESS FOR SOIL PASTEURIZATION
Filed July 16, 1935
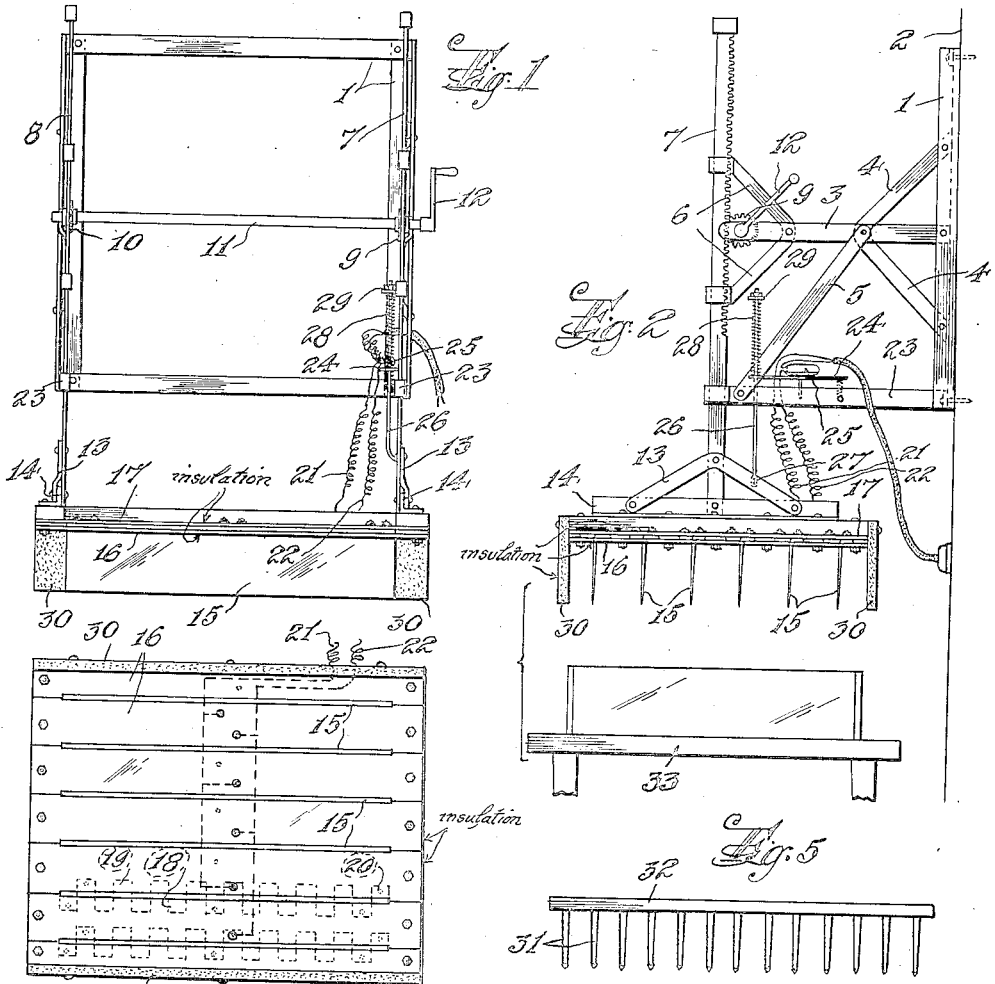
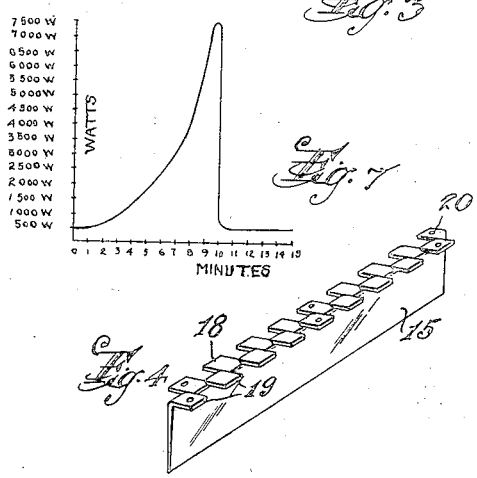
INVENTOR
Waburn C. Krueger
BY
A. D. T. Libby
ATTORNEY Patented Apr. 7, 1936

2,036,416

UNITED STATES PATENT OFFICE 2,036,416

APPARATUS AND PROCESS FOR SOIL PASTEURIZATION

Wabun C. Krueger, Dayton, N. J., assignor to Endowment Foundation, New Brunswick, N. J., a corporation of New Jersey Application July 16, 1935, Serial No. 31,713

11 Claims. (Cl. 47—1)

This invention relates to an apparatus for the treating of soil, particularly in greenhouse and vegetable-growing plants.

To eliminate soil-borne plant diseases and pests, steam or chemical sterilizers are commonly used. Steam, however, for sterilizing or "pasteurizing", requires expensive and quite elaborate equipment, and its use is not applicable to the small grower. Chemical sterilization is readily applicable to small production units, but has the disadvantage that it does not affect weed seeds.

It is the general object of my invention to provide an electrical sterilization apparatus and process which has all the advantages of regular steam sterilization without the disadvantages, because of its being more flexible in its application, its readiness for instant use, and relatively low equipment investment. In addition, electrical sterilization is more or less self-regulating in the sense that the current used is directly proportionate to the conductivity of the soil between the electrodes, and falls off in demand as soon as the maximum heating or steaming period has been reached. This is due to the drying action of the soil in contact with the electrodes, which automatically tends to insulate them from the soil and thus cuts down the current passing from the electrodes to the soil.

My electrical sterilization method is highly expeditious, for within the range of composted soil, the time required is from seven to twelve minutes to reach a soil temperature of 175° to 190°, using 220 or 110-volt source of current. This temperature heats the soil sufficiently to vaporize the soil moisture, and by means of this scheme, the heat destroys objectionable soil organisms and weed seeds. After the above temperature has been reached, the current can then be turned off and the residual heat continues to sterilize or "pasteurize" the soil over a period of an hour or more. The energy consumption required varies from one-fifth to one-half of a kilowatt hour per square foot of soil surface three inches deep, which places the electrical sterilization method in a very favorable position with respect to cost of operation.

The apparatus used in my process of sterilization is depicted more or less diagrammatically on the attached drawing wherein:

Figure 1 is a front view of an apparatus which may be used for this purpose.

Figure 2 is a side view of Figure 1.

Figure 3 is a bottom view of Figure 1.

Figure 4 is a perspective view of one type of plate electrode which may be used in the apparatus.

Figure 5 is a side view of another form of apparatus, the bottom view of which is shown in Figure 6.

Figure 7 is a diagram illustrating the automatic control of the power required in the process.

In the various views, wherein like numbers refer to corresponding parts, 1 illustrates the frame work which may be carried on any support means 2. The frame 1 has a plurality of arms 3 with braces 4, 5 and 6. Carried by the ends of the braces 6 are two racks 7 and 8 operated by pinions 9 and 10 carried on a shaft 11 adapted to be turned by a crank 12. To the lower ends of the racks 7 and 8, is fastened by suitable brackets 13, a carrier 14. The carrier 14 is made up of a plurality of wedge-shaped plates 15 each insulated from the other by a plurality of suitable insulating strips 16 and 17 and such others as may be necessary.

As shown in Figure 4, the plate 15 may be formed with offset lugs 18 and 19 which may be provided with holes 20 for fastening the plates 15 between the various insulating strips 16 and 17. Also, certain of the lugs 18 or 19 may be utilized for attaching the conductors 21 and 22 thereto as diagrammatically illustrated in Figure 3, from which figure it will be seen that alternate plates are connected to the leads 21 and 22.

On the frame brace 23 there is mounted a switch member 24 on which is supported a switch 25 preferably of the liquid automatic type, such as a mercury switch. Passing through one end of the lever 24 is a rod 26 which is pivotally connected at 27 to one of the brackets 13 on the carrier 14. Around the rod end 26 is a spring 28 carrying a nut and washer 29 by which the tension of the spring 28 may be adjusted so that as the racks 7 and 8 are moved, the switch arm 24 will conform to the movement of the racks on the carrier 14. Thus, when the carrier 14 is moved downwardly by the crank 12 to force the plates 15 into the soil in the "flats" 33—which are shallow boxes generally of wood containing the soil for sprouting of seeds or plants to be transplanted—the switch 25 is closed to apply current to the electrode plates when these plates are substantially in their full working position in the soil. Preferably the carrier 14 is provided with sides 30 forming a protecting apron around the plates, whereby, if the apparatus should be moved to lower the carrier 14 when no "flat" is in position, these plates would not be fully exposed to the operator or one passing by the apparatus at such a time.

When the plates 15 have been forced into the soil as above explained, the current is applied automatically to the switch 25, and because of the moisture in the soil, the current will be somewhat as depicted in Figure 7. After a period of a few minutes, as previously explained, the soil temperature will rise to a point which will rather rapidly change the moisture therein to steam, which kills the plant organisms and the viability of the weed seeds therein, and as the steam passes out of the soil, the soil becomes drier and the current falls somewhat as indicated in Figure 7, at which time the current may be cut off by a suitable switch, or the apparatus removed and applied to another "flat", while the residual heat in the soil just treated continues to sterilize or pasteurize it over a period of an hour or more.

Soils that are ready for use should contain a reasonable amount of moisture. If not, the moisture must be applied before using the sterilizing apparatus. If the soil is non-conducting in nature, such as a sandy soil, then it must be moistened, and preferably with a weak saline solution.

I have found that the use of a tapered plate as indicated is highly essential for carrying out the process described, for the reason that it insures a perfect soil contact on both sides of the plate, whereas a parallel-sided plate will not make contact, as the entering edge pushes the earth away from the plate.

In place of the tapered plates shown in Figure 4, I may use tapered pins 31 held by an insulating frame 32, alternate pins being connected to opposite sides of the electrical circuit. Such tapered pins offer less inserting pressure on the carrier 14 than is required by the tapered plates.

While I have shown the frame of the apparatus used attached to what might be termed a fixed support, this support may be on a suitable truck together with a generator and a prime mover therefor, whereby the whole unit may be movable as a complete structure. The frame 1 may also be carried on a suitable track in a greenhouse, whereby the apparatus may be readily moved to any part thereof for application to any desired "flat" or soil to be treated.

Other modifications may be made in the details entering into the construction of my apparatus, without departing from the spirit of my invention or the scope of the appended claims.

What I claim is:

1. An electric soil sterilizer including a frame, a carrier, means carried by the frame for raising and lowering said carrier, a plurality of tapering metallic members insulatingly fastened in spaced relation to said carrier and depending from one side thereof, alternate ones of said members being electrically connected together and to a source of current.

2. An electric soil sterilizer as set forth in claim 1, further characterized in that said raising and lowering means comprises a pair of spaced racks with a pinion for each rack, a shaft carrying the pinions, and means for operating said shaft.

3. An electric soil sterilizer as set forth in claim 1, further characterized in that said tapered metallic members are in the form of plates.

4. An electric soil sterilizer as set forth in claim 1, further characterized in that said tapered metallic members are in the form of plates having mounting lugs at the mounting edge bent over in opposite directions into substantially the same plane.

5. An electric soil sterilizer as set forth in claim 1, further characterized in that said tapered metallic members are in the form of plates.

6. An electric soil sterilizer as set forth in claim 1, further characterized in that said tapered metallic members are in the form of pegs.

7. An electric soil sterilizer as set forth in claim 1, further characterized in that said carrier has a skirt of insulating material around its periphery for the purpose described.

8. An electric soil sterilizer as set forth in claim 1, further characterized in that switch means are automatically operated to close the electric circuit to said members when said metallic members nearly reach their full operative position in the soil to be treated, and further characterized in that said switch means acts to open the circuit when the carriers with said metallic members are raised from the soil.

9. The process for pasteurizing plant soil and its contents, which consists in simultaneously forcing into the soil a plurality of spaced tapered electrodes, applying to said electrodes a source of current having a low voltage rating, for a time which will cause a rise in temperature in the soil to an ultimate value of 175° to 190°, then withdrawing all of the electrodes simultaneously, at the same time automatically cutting off the current from said electrodes.

10. The process of pasteurizing plant soil and its contents, which consists in simultaneously forcing into the soil a plurality of spaced tapered electrodes, applying to said electrodes a source of current, preferably not in excess of 220 volts, until the passage of current therethrough causes a rise in temperature of the soil which will destroy the diseases and pests in the soil and its contents.

10. The process of pasteurizing plant soil and its contents, which consists in forcing into the soil a plurality of spaced tapered electrodes, applying to said electrodes, a source of current having a voltage and characteristics such as are commonly used in houses and factories for lighting and power purposes, for a time which will cause a rise in temperature in the soil to an ultimate value of 175° to 190°, then cutting off the current and allowing the residual heat to continue the pasteurization.

11. The process of pasteurizing plant soil and its contents, which consists in forcing into the soil a plurality of spaced tapered electrodes, applying to said electrodes, a source of current having a voltage and characteristics such as are commonly used in houses and factories for lighting and power purposes, until the moisture in the soil has been dried out so the current passing therethrough will automatically take a decided drop, then cutting off the current and allowing the residual heat to continue the pasteurization.

WABUN C. KRUEGER.